(12) United States Patent
Varanasi

(10) Patent No.: US 6,219,341 B1
(45) Date of Patent: Apr. 17, 2001

(54) METHOD FOR BANDWIDTH EFFICIENT MULTIPLE ACCESS WIRELESS COMMUNICATION

(75) Inventor: Mahesh K. Varanasi, Boulder, CO (US)

(73) Assignee: University Technology Corporation, Boulder, CO (US)

( * ) Notice: Subject to any disclaimer, the term of this patent is extended or adjusted under 35 U.S.C. 154(b) by 0 days.

(21) Appl. No.: 09/040,783

(22) Filed: Mar. 18, 1998

Related U.S. Application Data

(60) Provisional application No. 60/041,123, filed on Mar. 20, 1997.

(51) Int. Cl.$^7$ .................................................. H04J 3/16
(52) U.S. Cl. ........................................ 370/252; 370/468
(58) Field of Search .................................. 370/252, 254, 370/251, 468, 535, 537, 319, 320, 321, 318, 317, 311, 332, 333, 335, 336, 337, 341, 347, 350, 441, 442, 310, 314, 219, 324, 326, 329, 376, 342–344, 480, 477; 455/38.3; 375/130

(56) References Cited

U.S. PATENT DOCUMENTS 5,729,607 * 3/1998 DeFries et al. .................... 375/254
5,812,947 * 9/1998 Dent .................................. 455/427

* cited by examiner

Primary Examiner—Dang Ton
(74) Attorney, Agent, or Firm—Bell, Boyd & Lloyd LLC

(57) ABSTRACT

A method for wireless communication utilizes available channel bandwidth when multiplexing a plurality of user signals over a communication channel. The method utilizes signal power characteristics as a signature to multiplex and de-multiplex the plurality of signals applied to the communication channel. Many wireless communication applications are required to utilize a limited, assigned frequency range. Modulation of digital information in such a limited bandwidth is a critical factor in determining the data transferred through the wireless communication channel. The present invention provides for multiplexing of a plurality of digital data sequences over a wireless communication channel having a fixed frequency range. The method provides for a base station which dynamically assigns signaling power parameters to each remote device which is optimally bandwidth-efficient for present signal traffic loads and for present received power conditions. Depending upon a number of factors, the method improves channel bandwidth utilization by factors of two to three over presently known methods. The communication method may be applied to many communication applications wherein a plurality of diverse user signals are multiplexed onto a single communication channel. Exemplary of such applications are wireless voice communication, e.g. digital cellular telephony and wireless data communications, e.g. wireless computer networking.

12 Claims, 1 Drawing Sheet

METHOD FOR BANDWIDTH EFFICIENT MULTIPLE ACCESS WIRELESS COMMUNICATION

This application claim benefit to Provisional Application 60/041,123 filed Mar. 20, 1997.

BACKGROUND OF THE INVENTION

The present invention generally relates to wireless communication and, in particular, to a method for multiplexing a plurality of user signals over a communication channel having a fixed frequency range in an efficient manner with -respect to channel bandwidth utilization.

It is known in the art to utilize radio frequency communication channels to transfer digital data between devices. Digital data is encoded on the channel such that a parameter of the communication channel is modulated in accordance with the values of the digital data bit sequence to be transferred. Many applications of such communication channels permit multiple, simultaneous access to the channel by a plurality of digital data streams, for example, a plurality of digitized voice data streams or a plurality of computer digital data streams. The plurality of digital data streams is multiplexed over the communication channel by subdividing the channel into a plurality of subchannels each characterized by unique communication parameters which may be de-multiplexed at the opposite end of the communication channel.

A variety of communication parameters is known to be useful for such subdivision of the communication channel. For example, time division multiple access, also referred to herein as TDMA, multiplexes the subchannels onto the channel by assigning each subchannel a period of time during which the subchannel uses the channel exclusively. Frequency division multiple access techniques, also referred to herein as FDMA, assign each subchannel a sub-range of the fixed frequency range. Code division multiple access techniques, also referred to herein as CDMA, assign a signature to each subchannel which describes the pulse amplitude modulation, also referred to herein as PAM, to be used by the subchannel for communication. Well-known digital signal processing techniques may be applied to de-multiplex such multiplexed signals on the communication channel.

A variety of techniques have been applied to many of these known modulation methods to further improve the utilization of the channel bandwidth. It is a continuing problem to improve the bandwidth utilization of a channel so as to maximize the data throughput over the channel. In particular, it is a continuing problem to dynamically adjust the multiplexing techniques to adapt to particular signaling patterns, usage, and power. As mobile transmitters and receivers are moved relative to one another, channel bandwidth utilization efficiency may change. It is a problem to adapt presently known multiplexing techniques to such dynamic environmental factors.

SUMMARY OF THE INVENTION

The present invention solves the above and other problems thereby advancing the state of the useful arts by providing methods for multiplexing a plurality of digital data streams over a communication channel in a manner which is efficient in bandwidth utilization and dynamically adaptable to changes in the communication power and other parameters. The present invention thereby provides bandwidth efficient multiple access also referred to herein as BEMA.

As compared to prior multiplexing techniques, the receiver operable in accordance with the present invention uses successive cancellation decoding techniques. Signature waveforms are specifically designed for each receiver (subchannel) presently using the multiplexed communication channel. The dynamically designed signature waveforms are dynamically allocated to the transmitters operable in accordance with the methods of the present invention. Unlike the teaching of prior multiplexing techniques, the signature waveform used between a particular transmitter and receiver operable in accordance with the present invention is not statically assigned or otherwise pre-determined or pre-designed to be orthogonal or quasi-orthogonal. Rather, the signature waveforms are designed so as to meet receiver performance specifications for each user (subchannel). The dynamically designed waveforms may be dynamically re-allocated and re-designed in response to changes in the traffic conditions, received power levels, number of transmitters and other parameters.

In particular, the methods of the present invention provide for design of a signature waveform which modulates signal characteristics in a manner dynamically determined to be efficient in view of presently measured channel characteristics.

To this end, in an embodiment of the present invention, a method for improving channel bandwidth utilization in a communication system is provided. The method comprises the steps of: providing an available communication channel; evaluating available channel bandwidth for a plurality of signals applied to the available communication channel; determining signal power characteristics of the plurality of signals; defining signature waveforms; and multiplexing the plurality of signals onto the communication channel based on the signature waveforms.

In an embodiment,. the plurality of signals are digital data sequences.

In an embodiment, the available channel has a fixed frequency range.

In an embodiment, signaling power parameters are assigned to each receiving device.

In an embodiment, signature waveforms are designed for each receiving device.

In an embodiment, the signature waveforms to transmitters are dynamically allocated.

In an embodiment, the signature waveforms are designed to meet receiver performance specifications for each user.

In an embodiment, the signature waveforms are re-designed based on changes in traffic conditions in the communication channel.

In an embodiment, the signature waveforms are re-designed based on received power levels.

In an embodiment, the signature waveforms are re-designed based on the number of transmitters.

In an embodiment, extra received power is used to assign signals with smaller bandwidths.

In an embodiment, the number of users is increased by using extra received power to assign signals with smaller bandwidths.

It is, therefore, an advantage of the present invention to provide a method for improving channel bandwidth utilization in a communication system.

Another advantage of the present invention is to provide a method for designing signature waveforms for each receiving device in a communication system.

Additional features and advantages of the present invention are described in, and will be apparent from, the detailed description of the presently preferred embodiments and from the drawings.

DETAILED DESCRIPTION OF THE PRESENTLY PREFERRED EMBODIMENTS

Figure 1:
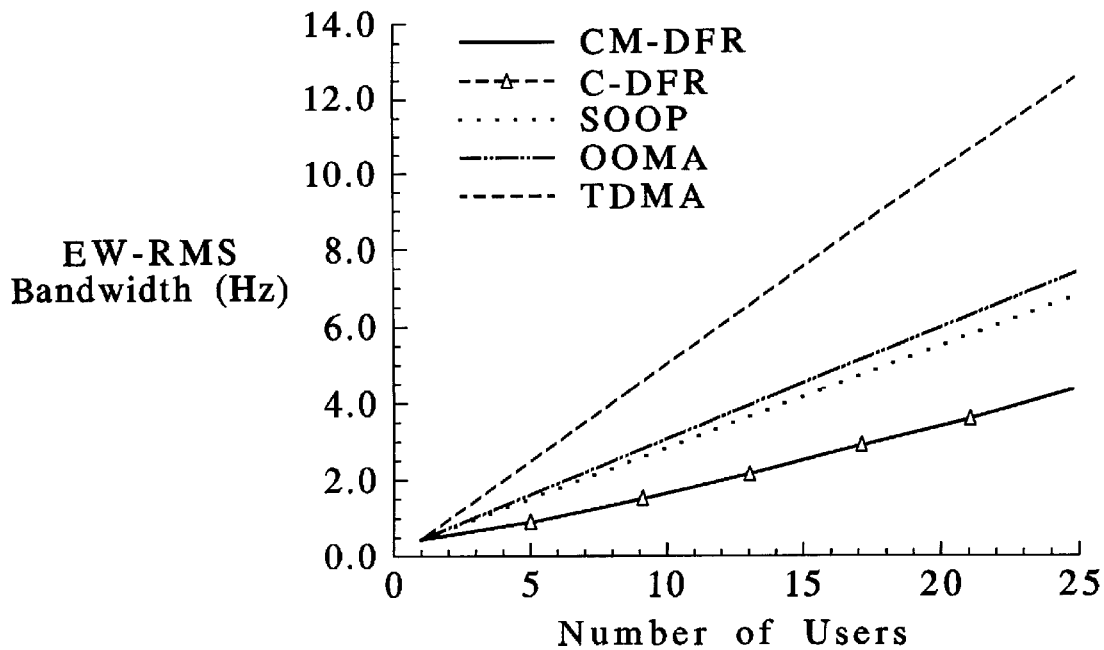
FIG. 1 illustrates a graph of bandwidth requirement in an embodiment of a method of the present invention.

The present invention provides a multiple access technique with the potential of offering a higher spectral efficiency than well-known multi-access techniques such as TDMA, FDMA, and CDMA. At the heart of this new technique are signal processing algorithms that realize the functions of multi-user equalization and signal design, and which are developed by taking a combined approach to those two subjects. The present invention describes and solves the problem for the synchronous multiple access channel with additive Gaussian noise, demonstrates substantial gains over the TDMA strategy in that context and implements a Bandwidth Efficient Multiple Access (BEMA) scheme for realistic wireless multi-use communications.

The multiple access communications problem is one where several autonomously operating users transmit information over a common communications channel as described in R. G. Gallager, "A Perspective on Multiacess Channels," IEEE Trans. Inform. Theory, 31:2, 124–142, March 1985. Static Time-Division Multiple Access (TDMA) or Frequency-Division Multiple-Access (FDMA) techniques pre-assign time or frequency bands to all users unfortunately, these multiple-access techniques are absurdly wasteful in time and bandwidth when used in applications where communications is bursty as in personal, mobile, and indoor communications. In such applications, some form of dynamic channel sharing is therefore necessary. While Random Multiple Access techniques such as ALOHA allow dynamic channel sharing (see, for example, J. L. Massey, "Special Issue on Random-Access Communications" in IEEE Trans. Inform. Theory, 31:2, 117–306, March 1985 and N. Amramson, Ed., Multiple Access Communications: Foundations for Emerging Technologies, IEEE Press, 1993), they are, however, unsuitable for the aforementioned applications where there is usually more than one active transmitter at any given time. Consequently, a dynamic version of TDMA has emerged as the multiple-access technique of choice for, for example, the European digital cellular mobile radio (GSM) system (see, for example, Sophia Antipolis, Global System for Mobile Communication (GSM)-13 Recommendations, European Telecommunications Standardization Institute, France, April 1988). Qualcomm's Code-Division Multiple Access (henceforth Q-CDMA) system (see, for example, A. J. Viterbi, "CDMA: Principles of Spread-Spectrum Communications, Addison Wesley, 1995) is increasingly accepted in the telecommunications industry in North America (see, for example, "Mobile Station-Base Station Compatibility Standard for Dual-Mode Wideband Spread-Spectrum Cellular System IS-95A," Telecommunications Industry Associate, TIA/EIA, Washington, D.C., 1995) and elsewhere.

Based on research on multi-user detection, primarily in academia, a different version of CDMA has evolved (see, for example, S. Verdu: "Multiuser Detection," Advances in Statistical Signal Processing: Signal Detection, JAI Press, 1993, pp. 269–410). A new multiple access technique called Bandwidth Efficient Multiple Access is described herein (referred to henceforth as BEMA). One objective of BEMA is to obtain as high a spectral efficiency as possible for wireless multi-access communication while meeting reception fidelity specifications for all active transmitters and doing so under both complexity and cost constraints.

The salient features of dynamic TDMA and CDMA will be described herewith so as to distinguish them from, and motivate, BEMA. The BEMA scheme is also described hereinafter. A combined approach is also developed to multi-user equalization and signal design for it by considering the synchronous additive Gaussian multiple-access channel model.

Dynamic TDMA requires a reservation channel which the transmitters use to let the base station know of their need to access the channel. Dynamic TDMA also requires a feedback channel through which the base station informs the active transmitters of its strategy of time-division multiplexing. Adaptive timing alignment is used in GSM to ensure that the transmissions of different users are non-overlapping in time. GMSK modulation is used for high spectral efficiency and resistance to adjacent channel interference, power control is used to keep adjacent channel interference low, and slow frequency hopping is used to combat frequency-selective fading. The receiver at the base station assumes adjacent channel interference to be additive noise, and the receiver is designed to deal with a single-user channel with inter-symbol interference due to fading multipath propagation (see R. Steele. Mobile Radio Communications, IEEE Press, 1995, Pentech Press 1992.)

Multi-user detection has given credence to a multiple access technique called Code-Division Multiple Access (CDMA). This multiple access technique is very different from Q-CDMA. For example, signature waveforms are pre-assigned to each transmitter which the transmitter then uses to transmit a linearly pulse-amplitude modulated (PAM) waveform as in a single-user channel. The signature waveforms are generally assumed to have the property of mutual quasi-orthogonality in the case of synchronous CDMA (S-CDMA) and quasi-orthogonality for all relative time-offsets for asynchronous CDMA (A-CDMA). The receiver at the base station sees a superposition of those transmitted PAM waveforms, each of which may have passed through a multiplicative fading channel and/or an additive Gaussian noise channel. It then uses multi-user detection to jointly detect the information transmitted by all or a subset of the users.

An important special case of CDMA is orthogonal CDMA, where signaling waveforms may overlap in time and frequency, but they are nevertheless orthogonal. An example of orthogonal S-CDMA is one where transmitters are assigned Walsh-Hadamard sequences for modulation. Another example is static TDMA (called "static" since signature waveforms are pre-assigned) where orthogonality is achieved through the use of waveforms that are non-overlapped in time. A particular case of orthogonal A-CDMA is static FDMA where orthogonality is achieved through transmit filters with non-overlapping passbands. The signal reception problem in orthogonal CDMA is no more complex than in TDMA or FDMA where the problem essentially decouples into as many single-user reception problems as there are simultaneous transmitters.

So why intentionally introduce quasi-orthogonality and then deal with the extra burden of multi-user detection at the receiver? The most prominent claim for intentional quasi-orthogonality is that, the laxer requirement of quasi-orthogonality, as opposed to the more stringent condition of orthogonality, will result in a significantly better utilization of bandwidth. It then becomes necessary to know whether such quasi-orthogonal signals do, in fact, exist. Quasi-orthogonality can, for instance, be realized with spread-spectrum signals, such as direct-sequence spread-spectrum (DS/SS) signals, but it must be determined whether better bandwidth utilization is delivered as a result. As an example, consider the properties of Gold sequences (see R. Gold, "Optimum Binary Sequences for Spread-Spectrum Multiplexing," IEEE Trans. Inform. Theory, Vol. 14, pp. 154–156, October, 1967). There are N+2 sequences of length $N=2^n-1$ (n odd) which have normalized maximum cross-correlations and auto-correlations over arbitrary relative delays that are bounded from above by $N^{-1}(2^{(n+1)/2+1})$. Consequently, an A-CDMA system which employs Gold sequences can be seen to be only comparable, not superior, in bandwidth efficiency to static FDMA. Furthermore, recent attempts at designing better signals by relaxing the constraints of quasi-orthogonality and the spread-spectrum structure are promising, but they have only yielded signals for the 2-user Gaussian channel (see R. Cheng et al., "Capacity of Root-Mean-Square Bandlimited Gaussian Multiuser Channels," IEEE Trans. Inform. Theory, IT:37:3, pp. 453–465, May 1991 and R. Cheng et al., "The Effect of Asynchronism on the Total Capacity of Gaussian Multiple Access Channels," IEEE Trans. Inform. Theory, IT:38:1, pp. 2–13, January 1992). In any case, unless each user in a cell has an infinite reservoir of data to send, CDMA has a poor bandwidth efficiency relative to the well-established dynamic versions of TDMA and FDMA. The central problem with CDMA is that it is a static strategy in that it pre-assigns a signature waveform to every transmitter.

Spread-spectrum signaling was originally researched to meet military objectives such as jamming resistance and low probability of detection and interception (see M. K. Simon et al., Spread Spectrum Communications handbook, McGraw-Hill, New York, 1994). The area of multi-user detection was developed in the context of static CDMA (see S. Verdu, "Multiuser Detection" infra.) and so were the results of information theory (see S. Verdu, "Capacity Region of Gaussian CDMA Channels: The Symbol-Synchronous Case," Proc. $24^{th}$ Allerton Conf. Commun, Contr. and Comput., pp. 1025–1034, Allerton, Ill., October 1986, and S. Verdu, "The Capacity Region of the Symbol-Asynchronous Gaussian Multiple-Access Channel," IEEE Trans. Inform. Theory, IT,35:4, July 1989, pp. 733–751) and signal design (see R. Cheng et al., "Capacity of Root-Mean-Square Bandlimited Gaussian Multiuser Channels," IEEE Trans. Inform. Theory, IT:37:3, pp. 453–465, May 1991 and R. Cheng et al., "The Effect of Asynchronism on the Total Capacity of Gaussian Multiple Access Channels," IEEE Trans. Inform. Theory, IT:38:1, pp. 2–13, January 1992, and D. Parsavand et al., "RMS Bandwidth Constrained Signature Waveforms that Maximize the Total Capacity of PAM-Synchronous CDMA Channels,"IEEE Trans. Commun., COM-44:, January 1996, pp. 65–75) as they pertain to multiple-access channels where the transmitters use distinct waveforms. For purposes of bandwidth efficient communication, however, it is far more useful to see those results as applicable to dynamic CDMA described below.

In dynamic CDMA, a low-rate random access reservation channel is provided for uplink transmissions from the mobile station to the base station to set up a call. So a modicum of order is introduced, and maverick transmitters that access the channel without prior permission are not supported (this is a feature of static CDMA that is sacrificed). A feedback channel through which the base station dynamically assigns signature waveforms presumably by drawing from a bank of pre-designed waveforms is also provided. These waveforms may overlap in time and frequency and may also be non-orthogonal. Note that dynamic TDMA and FDMA are now special cases of dynamic S- and A-CDMA, respectively. Multi-user detection is, therefore, proposed at the base station.

Spread-spectrum- signals may be dynamically allocated, and since spread-spectrum signals are robust to symbol asynchronism, such a dynamic SSMA strategy has the advantage over dynamic TDMA of not requiring stringent time synchronization. A fair appraisal of dynamic SSMA requires comparison with dynamic FDMA since they both allow symbol asynchronism. Dynamic SSMA has a bandwidth efficiency that is at best only comparable to dynamic FDMA for the same reason that static SSMA cannot be superior to static FDMA. Even to just be competitive with dynamic FDMA, spread factors must be approximately equal to the maximum number of users allowed per carrier. In such cases, when a carrier is not lightly loaded, so that the number of active users for that carrier is a sizeable fraction of the assigned spread factor, decorrelative and linear MMSE detectors (see R. Lupas et al., "Near-Far Resistance of Multiuser Detectors in Asynchronous Channels," IEEE Trans. Commun. 38:4, April 1990, pp. 496–508; M. K. Varanasi, "Noncoherent Detection in Asynchronous Multiuser Channels," IEEE Trans. Inform. Theory 39:1, January 1993, pp. 157–176; Z. Xie et al., "A Family of Suboptimum Detectors for Coherent Multiuser Communications," IEEE Journal Selec. Areas Commun. 8:4 May 1990, pp. 683–690; U. Madhow et al., "Performance Analysis of MMSE Detectors for Direct-Sequence CDMA Assuming Random Signature Sequences," IEEE Trans. Commun. 42:12, December 1994, pp. 3178–3188; R. Kohno et al., "An Overview of Adaptive Techniques for Interference Suppression in CDMA Systems," Wireless Personal Communications, 1:1, January 1994, pp. 3–21; and M. Honig et al., "Blind Adaptive Multiuser Detection," IEEE Trans. Inform. Theory 41:4 July 1995, pp. 944–960) will not be satisfactory. It may, however, still be possible to have high reception fidelity by implementing high-performance non-linear detectors such as the decision feedback detectors of M. Abdulrahman et al., "Decision Feedback Equalization for CDMA in Indoor Wireless Communications," IEEE Journal Selec. Areas Commun., May 1994, pp. 698, 706; E. A. Fain et al., "Cyclic Decision Feedback Multiuser Sequence Detection," Proc $32^{nd}$ Annual Allerton Conf on Communication, Control, and Computing, Sep. 28–30, 1994; and A. Duel-Hallen, "A Family of Decision Feedback Multiuser Detectors for Asynchronous Code-Division Multiple Detection," IEEE Trans. Commun. 43:2/3/4, 1995, pp. 421–434; the group sequence detectors of M. K. Varanasi, "Group Sequence Detection: Bridging the Yawning Gap Between Linear and Optimum Multiuser Detection," Proc. Inform. Theory Workshop on Information Theory, Multiple-Access and Queueing, April 1995, and the parallel interference cancellation detector of D. Divsalar et al., "A New Approach to Parallel Interference Cancellation for CDMA," pre-print, 1996. Moreover, for heavy traffic, it may even be necessary to implement optimum multi-user detectors such as in S. Verdu, "Minimum Probability of Error for Asynchronous Gaussian Multiple-Access Channels," IEEE Trans. Inform. Theory, IT-32:1, January 1986, pp. 85–96 and Z. Zvonar et al., "Multiuser Detection in Single-Path Rayleigh Fading Channels, IEEE Trans. Commun. 42:4, April 1994, pp. 1729–1739 which entail a steep increase in computational complexity. This must be weighted against the fact that the hardware costs of base-stations in FDMA are higher in that they must have as many transceivers as the maximum number of users allocated per carrier (see R. Steele supra) whereas dynamic SSMA only requires one transceiver per carrier.

More generally, dynamic CDMA may be considered by relaxing the constraint that signature waveforms be quasi-orthogonal and of the spread-spectrum type. By optimally designing signature waveforms over this unconstrained class, it is possible, at least theoretically, to improve the performance of dynamic versions of TDMA, FDMA, and SSMA since these latter strategies correspond to specific instances of the class of all signaling waveform sets over which the optimization is sought. Moreover, the results of information theory (see Verdu, "Capacity Region . . ." supra and Verdu, "The Capacity Region of the Symbol . . ."supra) and signal design (see Cheng et al., "Capacity of Root-Mean-Square . . ." supra. and Cheng et al., "The Effect of Asynchronism . . ." supra) obtained for the S-CDMA and A-CDMA channels to this dynamic CDMA system. Unfortunately, the latter works have not yielded signature waveforms for more than the two-user synchronous and asynchronous Gaussian multiple access channels. Further research is necessary to design signature waveforms whose quasi-orthogonality is robust to mutual time offsets. For the synchronous Gaussian multiple-access channel, rather than optimizing the capacity region as in R. Cheng et al., "Capacity of Root-Mean Square Bandlimited Gaussian Multi-user Channels, IEEE Trans. Inform. Theory, IT:38:1, January 1992, pp. 2–13, the maximization of the total capacity was considered in Parsavand et al. supra. An algorithm for designating the optimum signature waveforms for the general K user problem was also obtained. So here, at least from an information theoretical viewpoint, a dynamic S-CDMA system that is guaranteed to out-perform dynamic TDMA in bandwidth efficiency is provided. In spite of the success of Parsavand et al. supra, there still remains a formidable gap between theory and practice. Now that the waveforms are available, achieving the promise of maximum total capacity is a matter of solving the multi-user coding problem which is one of designing high-rate codes for various users jointly and with enough structure so that they can efficiently and jointly be decoded.

BEMA may be loosely defined as any multi-access strategy that has a significantly higher bandwidth efficiency than dynamic FDMA or TDMA and, which is, at the same time, cost competitive with the latter schemes. Both these criteria are admittedly vague, but this definition is nevertheless concrete enough.

Rather than delving head-long into the high-risk direction of multi-user coding research, the idea of successive cancellation decoding, proposed for the conventional Gaussian multiple-access channel, where all users employ the same signature waveform, can be generalized to the Gaussian multiple-access channel which allows the use of distinct waveforms, so that coding and decoding may be achieved with off-the-shelf single user codecs. Furthermore, with this non-jointly optimal receiver, perhaps it is not appropriate to use signals that are optimal in the sense of achieving maximum total capacity as in Parsavand et al. supra which are inherently premised on the use of a jointly optimal receiver. So, new methods must be found to obtain signature waveforms that are ideally matched to our new single user codecs based receiver. With these ideas, a BEMA system may be introduced.

The details of this multiple access technique are different from dynamic TDMA or CDMA in that the multi-user receiver is now of the successive cancellation type, the signature waveforms are specifically designed for that receiver, and these waveforms are dynamically allocated to the transmitters; they are not pre-determined to meet receiver performance specifications for each user for given traffic conditions, and they may be slowly re-allocated as the traffic conditions—such as the received power levels and number of active transmitters—change and evolve.

A problem is considered where several earlier approaches to multi-access communications can be reviewed including those from multi-user information theory, multi-user detection, and multi-user signal design. To obtain provably higher bandwidth efficiencies than dynamic TDMA, with a practically implementable multi-access technique, a unified approach to these three areas is necessary.

Consider a PAM, synchronous, Gaussian BEMA system where users are assigned signature waveforms that are time-limited to [0, T]. The signal that is received at the base station is modeled as the sum of K transmitting users and white Gaussian noise; it is given by:

$$r(t) = \sum_{k=1}^{N} \sum_{i=1}^{M} b_i(k) u_i(t - kT) + n(t), \qquad (1)$$

where $\{b_i(k)\}_k$ is the sequence of coded symbols sent by the $i^{th}$ user, $u_i(t)$ is the signature waveform of the $i^{th}$ user, and n(t) is an additive white Gaussian noise process with variance $N_{b\ 0/2}$. If each user's input waveform is power constrained to be $\omega_i$, then $$\frac{1}{NT} \sum_{k=1}^{N} b_i^2(k) = \omega_1$$

for each i. Define the correlation matrix, R according to $$R_{mn} = \int_0^T u_m(t) u_n(t) dt_1$$

and assume unit-energy waveforms so that $R_{kk}=1$, and let W be a diagonal matrix with $\{\omega_1, \omega_2 \geq \ldots, \omega_M\}$ as its diagonal. Assume without loss of generality that the users' powers are ordered so that $\omega_1 \geq \omega_2 \geq \ldots \geq \omega_M$.

The discrete-time model, after sampling the outputs of a bank of matched filters is r(k)–Rb(k)+n(k) (2) where b(k) is the vector of information symbols of the users and $\{n(k)\}$ is a set of independent, identically-distributed (i.i.d.), zero-mean, Gaussian random vectors, each with covariance $$\frac{N_0}{2} R.$$

This channel is called the Gaussian Multiple Access channel and use the acronym GMAC.

Three particular cases of the GMAC are interesting. The first corresponds to TDMA and, hence, to orthogonal waveforms so that R is an identity matrix with the signature waveforms constrained to being non-overlapping in time. The second corresponds to orthogonal multiple access where the signature waveforms can overlap in time, but are nevertheless orthogonal. Finally, the conventional Gaussian multiple access channel (CGMAC) assigns identical waveforms to all transmitters, so that $R=11^T$ where 1 is a vector of ones. The latter system relies entirely on coding with no spreading. The elements of the vector r(k) are all equal for the CGMAC. Hence, the model specializes to $r(k)=\Sigma_{i=1}^{K}b_i(k)+n(k)$ which is the standard Gaussian multiple access channel analyzed in information theory (see R. Kohno et al., "An Overview of Adaptive Techniques for Interference Suppression in CDMA Systems," Wireless Personal Communications, 1:1, January 1994, pp 3–21 and T. M. Cover et al., Elements of Information Theory, 1991).

Multi-user detection, and, to a lesser extent, multi-user information theory, have been very active areas of research for CDMA channels. Each, in its own way, has attempted to provide answers to the same issue—that of efficient and reliable transmission of information for a multiplicity of users that access a common communications channel. Yet, these areas have developed independently of each other. A unified approach is necessary.

Consider the synchronous Gaussian CDMA channel. Multi-user detection for these channels has concentrated mainly on uncoded systems and has attempted to provide the best performance in terms of a BER with constrained complexity (see R. Lupas et al., "Linear Multiuser Detectors for Synchronous Code-Division Multiple Access Channels," IEEE Trans. Inform. Theory, Vol. 35, No. 1, January 1969, pp. 123–136; M. K. Varanasi et al., "Near-Optimum Detection in Synchronous Code-Division Multiple-Access Systems," IEEE Trans. Commun. Vol. 39, No. 5, May 1991, pp. 725–736; A. Duel-Hallen, "Decorrelating Decision Feedback Multiuser Detector for Synchronous Code-Division Multiple-Access Channel," IEEE Trans. Commun., Vol. 41, No. 2, February 1993, pp. 285–290; and M. K. Varanasi, "Group Detection for Synchronous Gaussian Code-Division Multiple-Access Channels," IEEE Trans. Inform. Theory, July 1995, pp. 1083–1096). When applied to coded systems, rather than making hard decisions, the soft scalar outputs of a linear MMSE multi-user detector of that of the decorrelating decision feedback detector were passed on to the respective single-user decoders (see M. Rupf et al., "User-Separating Demodulation for Code-Division Multiple-Access Systems," IEEE J. Selec. Areas Commun., Vol. 12, June 1994, pp. 786–795; and T. Guess et al., "Onion Peeling for CDMA-Symmetric Rate Under RMS Bandwidth Constraints," 1996 Conf. on Information Sciences and Systems, Princeton University, March 1996, pp. 584–589) with post-decoding decision feedback in the latter case. This is referred to as multi-user equalization.

Information theory has provided a characterization of capacity regions for a variety of multiple-access channel models (see A. El Gamal et al., "Multiple User Information Theory," Proc. IEEE, 45:3; December 1980, pp. 1466–1483 and van der Mehlen, "A Survey of Multi-Way Channels in Information Theory, 1961–1976," IEEE Trans. Inform. Theory, Vol. 23, No. 1, January 1977) including the S-CDMA Gaussian channel of Verdu, "The Capacity Region of the Symbol . . ." supra. A particular case of the latter channel where all users are provided identical signature waveforms ($R=11^T$) reduces to the conventional Gaussian multiple access channel (CGMAC). For this channel, the idea of successive cancellation decoding or onion peeling was shown to achieve the vertices of the capacity region (see El Gamal, supra). Consequently, the multi-user communication system does not require joint multi-user codes, nor does it have to implement a jointly optimal decoder. K single user codes and the sequential implementation of K single user decoders in the receiver suffice. This is significant.

To build the bridge between multi-user equalization and multi-user information theory, consider the following definition of a multi-user decision feedback receiver which is a cascade of a multi-user equalizer and K single-user decoders operating sequentially a multi-user decision feedback receiver (DFR) is defined by a feed forward matrix F and a strictly lower-triangular matrix B which feeds back the decoded and re-encoded symbols of the users. Assuming for now that the re-encoded and fed-back symbols are correct, then $$y(k)=(FR-B)b(k)+\tilde{n}(k) \quad (3)$$

where $\{\tilde{n}(k)\}$ is a sequence of i.i.d., zero-mean, Gaussian random vectors with covariance $$\frac{N_0}{2}FRF^T$$

where the super-script T denotes transpose. Note that the multi-user decision feedback receiver addresses the complexity issue in a fundamental way and is elegantly unstuck from the difficult problem of having to deal with multi-user coding and jointly optimal decoding.

Simple decision feedback receivers based on three popular philosophies are described next. They are: (a) treat mutual inter-user interference as additive noise; (b) treat uncancelled inter-user interference as additive noise; and, (c) decorrelate uncancelled interference. Salient properties are included.

The single-user DFR (SU-DFR) is a bank of decoupled single user receivers and is motivated by the conventional spread-spectrum idea of treating inter-user interference as noise, as in military SSMA and Q-CDMA, so that F=I and B=0. Note that this is a trivial DFR since there is no decision feedback. Only when the signature waveforms are orthogonal as in TDMA or in orthogonal S-CDMA will the optimum receiver coincide with the SU-DFR.

The Single Output Onion Peeling (SOOP-DFR) derives from the philosophy of successive cancellation decoding where a user is decoded by ignoring only the uncancelled inter-user interference so that F=1, and B=L ($11^T$) where L(X) denotes the strictly lower triangular matrix with its non-zero elements given by the corresponding elements of X. It is useful to think of the Cover's successive cancellation decoder as this trivial SOOP decision feedback equalizer followed by a chain of single-user decoders.

The Cholesky DFR (C-DFR) proposed in T. Guess et al. supra is suggested by the decorrelating decision feedback multi-user detector first proposed for uncoded CDMA channels in Duel-Hallen, "Decorrelating . . ." supra, but it is used by the present invention in the equalizer mode so that $F=L^{-T}$, B=L-diag(L) where $R=L^TL$ is a Cholesky factorization of R, with L being a lower-triangular matrix. Note that the Cholesky DFR (C-DFR) exists whenever the correlation matrix is positive definite, so it requires the signature waveforms to be linearly independent.

For the particular case of the conventional GMAC $R=11^T$), the SOOP DFR was shown to achieve the vertices (with permutations on the order of decoding) of the capacity region in El Gamal supra. Interestingly, this elegant result was one of analysis. The successive cancellation decoder was not designed to do that. For the general GMAC, however, when F=I and when B is replaced by L (R), the resulting MDFR does not achieve the corner points of the general GMAC.

The successive cancellation decoding idea was studied for coded systems with no spreading in A. J. Viterbi, "Very Low Rate Convolutional Codes for Maximum Theoretical Performance of Spread-Spectrum Multiple-Access Channel," IEEE J. Selec. Areas Commun., Vol. 8, May 1990, pp. 641–649. There is a precedence in multi-user detection also of applying successive cancellation to uncoded CDMA systems (see R. Kohno, "Pseudo-Noise Sequences and Interference Cancellation for Spread-Spectrum Systems-Spread Spectrum Theory and Techniques in Japan," IEEEE Trans. E:74, May 1991, pp. 1083–1082 and P. Patel et al., "Analysis of a Simple Successive Interference Cancellation Scheme in DS/CDMA System," IEEE J. Selec. Areas Commun. Vol. 12, June 1994, pp. 796–807). When those strategies are used in the equalizer modes, they correspond to the SOOP strategy, i.e. with no equalization. It is important to realize that the SOOP strategy is strictly sub-optimal for all but the conventional GMAC.

The C-DFR does not achieve the corner points of the capacity region of the general GMAC either. Fortunately, by properly designing both F and b, it is possible to improve upon the performance of the C-DFR.

A systematic approach is proposed to design an optimum DFR. Assuming input symbols to be Gaussian, the capacity of the $i^{th}$ user is given by:

$$C_i = \frac{1}{2T} \log \left( 1 + \frac{(FR)_{ii}^2 w_i}{\sum_{j \neq i}((FR)_{ij} - B_{ij})^2 w_j + \frac{N_0}{2T}(FRF^T)_{ii}} \right). \tag{4}$$

Assuming perfect feedback, and this assumption can be technically justified for the GMAC, as it is justified for the CGMAC in B. Rimoldi et al., "A Rate-Splitting Approach to the Gaussian Multiple-Access Channel," IEEE Trans. Inform. Theory, 42:2, March 1996,. pp. 364–375, optimum feed forward and feedback filters are sought that maximize the capacity of each user. The resulting solution is called the Capacity Maximizing DFR (CM-DFR). See T. Guess et al., "Multiuser Decision Feedback Receivers for the. General Gaussian Multiple Access Channel" Proc. of the Annual Allerton Conf. on Communication, Control and Computing, October 1996, for the solution.

The CM-DFR actually achieves the corner points of the capacity region in recent work submitted for presentation at ISIT, Ulm, Germany, June 1997 by Varanasi et al., "Achieving the Vertices of the Capacity Region of General Gaussian Multiple-Access Channels with Decision Feedback Receivers." The special case of the result for the CGMAC does indeed yield Cover's successive cancellation decoder. The result can be seen to address, in part, Massey's call for the development of information theory or multiple-access systems in which several users send signals in the same band and the sum of these signals is received (see J. L. Massey, "Towards an Information Theory of Spread-Spectrum Systems," in Code-Division Multiple Access Communications ed. S. G. Glisic et al., Kluwer Academic publishers, 1995).

The idea of treating all other users' signals as noise is best, i.e. the optimal F and b are the identity matrix and L ($11^T$), respectively, only when there is no spreading. All others are non-trivial; strategies of assigning non-identical signature waveforms require non-trivial feedback and feed forward filters. The important question now is whether the extra generality of non-identical waveforms can be used to improve bandwidth efficiency. This question is answered by considering the signal design problem in the following sections.

To make a fair comparison, the best signals for TDMA are considered followed by those for orthogonal BEMA (O-BEMA), and then a constructive upper bound is obtained on bandwidth for the case of BEMA with the corresponding correlated, but linearly independent, signals with the Cholesky DFR as the receiver. The signal design problem for BEMA with possibly linearly dependent signaling and with the CM-DFR as the receiver is not described; however, numerical results for this optimum case are included.

The results in Parsavand et al. "RMS Bandwidth . . ." supra, while not directly translatable into-practice, are nevertheless valuable. The definition of EW-RMS bandwidth squared of a set of an arbitrary signature signal given as $$B^2 = \frac{1}{tr(W)} \sum_{i=1}^{M} w_i B_i^2, \tag{5}$$

where $B_i$ is the RMS bandwidth of $u_i(t)$. Proposition 7 of Parsavand et al., "RMS Bandwidth . . ." supra states that for a given positive-definite matrix $\check{R} \underline{\Delta} W^{1/2} R W^{1/2}$, there is a set of signature waveforms that have $\check{R}$ as their correlation matrix, and the EW-RMS bandwidth of these waveforms is less than or equal to that of any other set of signature waveforms that also have $\check{R}$ as their correlation matrix. This minimum bandwidth is given by $$B_{min}^2 = \frac{1}{(2T)^2} \frac{tr(\Lambda \Pi)}{tr(W)}, \tag{6}$$

where $\Lambda$ is a diagonal matrix containing the eigenvalues of $\check{R}$ in decreasing order, and $\Pi$ is a diagonal matrix whose $i^{th}$ diagonal element is given by $i^2$. This result is a critical building block in the signal design problem for the various decision feedback receivers.

For TDMA, the minimum required bandwidth is given by $$B^2 = \min \left\{ \frac{\sum_{i=1}^{M} \omega_i \frac{1}{(2T_i)^2}}{tr(W)} : \sum_{i=1}^{M} T_i = T, \; T_i > 0 \, \forall \, i \right\} \tag{7}$$

$$= \frac{1}{(2T)^2} \frac{\left(\sum_{i=1}^{M} \omega_i^{1/3}\right)^3}{tr(W)}.$$

The above formulation arises from equation (5) above when each signature waveform is a half-period sinusoidal pulse of width $T_i$ located on the interval [0, T]. Of course, these pulses are non-overlapping. The half-period sinusoidal pulse on an interval minimizes the RMS bandwidth of all possible pulses on the interval. The solution to the minimization problem in equation (7) is given in the same equation and can be found using Lagrange multipliers. Note that this is not the usual TDMA employed in GSM, for instance. There, equal durations are assigned for each user. In the present invention, unequal durations are allowed to give the TDMA scheme the benefit of this greater generality by taking advantage of these extra degrees of freedom. This comparison is thus conservative when advantages are shown in bandwidth efficiency over this version of TDMA.

As for the orthogonal BEMA channel, the CM-DFR reduces to the SU-DFR. Since the signature waveforms of the users are orthogonal, the minimum required bandwidth is given in equation (6) above. A corresponding set of signature waveforms can be found by referring to Parsavand et al., "RMS Bandwidth . . ." supra. These signature waveforms do not fall within the TDMA category. Even optimum orthogonal signaling yields bandwidth efficiency that is higher than that of dynamic TDMA. This is referred to as Optimum Orthogonal Multiple Access or OOMA.

If it is assumed that symbols of users 1 to i−1 were decoded correctly, then their interference can be subtracted from $y_i(k)$ to leave $L_{ii}b_i(k)+\tilde{n}_i(k)$ which is readily identified as a single-user, discrete-time Gaussian channel. Thus the capacity of the effective single-user channel in nats per second is $$C_i = \frac{1}{2T}\log\left(1 + \frac{L_{ii}^2 w_i T}{N_0/2}\right). \tag{8}$$

As long as the assumption of perfect interference cancellation is made, then each of the M users can be encoded and decoded as for an equivalent single-user channel. This assumption is justified by requiring R to be such that each of $L_{ii}^2$ terms meets some lower bound.

As for signal design, the previously described approach of Cheng et al., "Capacity of Root-Mean Square . . ." supra or Cheng et al., "The Effect of Asynchronism . . . ," supra, or the more fruitful approach of Parsavand et al. "RMS Bandwidth . . . ," supra, is followed wherein the idea is to obtain signals that optimize the performance of the jointly optimum receiver. Only now, instead of the jointly optimum receiver, a complexity constrained multi-user DFRs is considered thereby resurrecting the underlying philosophy of those works, if not their details. In fact, that philosophy of transmitter design can be traced back to Berger et al. where the optimum transmitter design problem for the single-user ISI channel was posed as one that should minimize the mean squared error of an optimum equalizer that already minimizes the mean squared error over all equalizers for a given transmit filter. (See T. Berger et al., "Optimum Pulse Amplitude Modulation-Part 1: Transmitter Receiver Design and Bounds from Information Theory," IEEE Trans. Inform. Theoxy, 13, April 1967, pp. 196–208.) That work has since then given rise to an impressive literature with various extensions and generalizations culminating with the optimization of multi-input, multi-output (MIMO) transmit filters, for MIMO channels for both linear and decision feedback, MMSE equalizers. See J. Yang et al., "On Joint Transmitter and Receiver Optimization for Multi-Input Multi-Output Transmission Systems," IEEE Trans. Commun. 42:12, December 1994, pp. 3321–3231 and Yang et al., "Joint Transmitter Receiver Optimization for Multi-Input Multi-Output Systems with Decision Feedback," IEEE Trans. Inform. Theory, 40:5, September 1994, pp. 1334–1347.) While mathematically elegant and sound, the critique of that general approach is that, in practical situations, one is usually not interested in over-achieving reception fidelity. It is sufficient to just meet a performance specification. So rather than achieving that performance without overkill, the leftover is used to make the system more bandwidth efficient.

More specifically, the idea is to choose a correlation matrix, and, hence, a set of signature waveforms with minimum EW-RMS bandwidth as dictated by proposition 7 of Parsavand, "RMS Bandwidth . . . ," supra while achieving a given symmetric capacity. The SIR of the last user is $$\frac{w_M}{N_0/(2T)}$$

so the symmetric-SIR constraint is given by a percentage of the last user's SIR:

$$\frac{\lambda w_M}{N_0/(2T)}$$

where $y\epsilon(0, 1)$ is an excess power factor. Implicit here is the reasonable assumption that all users are strong enough, so that if each one was the only one transmitting with that power, they would be received satisfactorily.

Unfortunately, an exact analytical solution to the problem looks intractable from the outset because of the complicated relationship between the off-diagonal elements and the eigenvalues of the correlation matrix. The former define the signature waveforms to be used, and the latter give the EW-RMS bandwidth of these signature waveforms. By the present invention, a sub-optimal approach is adopted by creating R in a systematic way that provides a useful upper bound on the minimum bandwidth. The idea is to start with the last two users and to determine their correlation matrix so that the second to last user just meets the common performance specification for each user when the C-DFR is used. Note that with no error propagation, the performance of the C-DFR for that user is independent of the correlations between the other signals. With this fixed, how the third-to-last user is to be correlated is determined with the last two users in order that the C-DFR just meets that user's performance requirement. This defines a set of correlation matrices for the last three users of which the best candidate (in terms of bandwidth minimization) is picked, and this process is continued until the first user. So, users are decoded in the order of decreasing signal strengths and their signature waveforms are constructed in order of increasing signal strengths. The details of the construction of the correlation matrix can be found in Guess et al. "Onion Peeling . . ." supra.

The approach of the present invention allows the disparity in the received signal strengths of the users to be used to an advantage in reducing bandwidth requirements. Any extra received power is used to assign signals with smaller bandwidths and, hence, increase the number of users that can be supported. This is in stark contrast with other multiple-access strategies, such as dynamic TDMA and FDMA, that do not have this feature. A-CDMA or S-CDMA pre-assign signals which precludes using power imbalances to its advantage altogether and dynamic CDMA involves signal assignment from a pre-determined bank of signals. The multi-user detectors in static or dynamic CDMA do, however, combat the power imbalance or the so-called near-far problem through multi-user detection. Finally, the Q-CDMA system not only fails to take advantage of the user strength discrepancy, it wages a losing, albeit impressive, battle on the precious power imbalance feature of the wireless multiple access channel through elaborate methods for power control.

Figure 2:
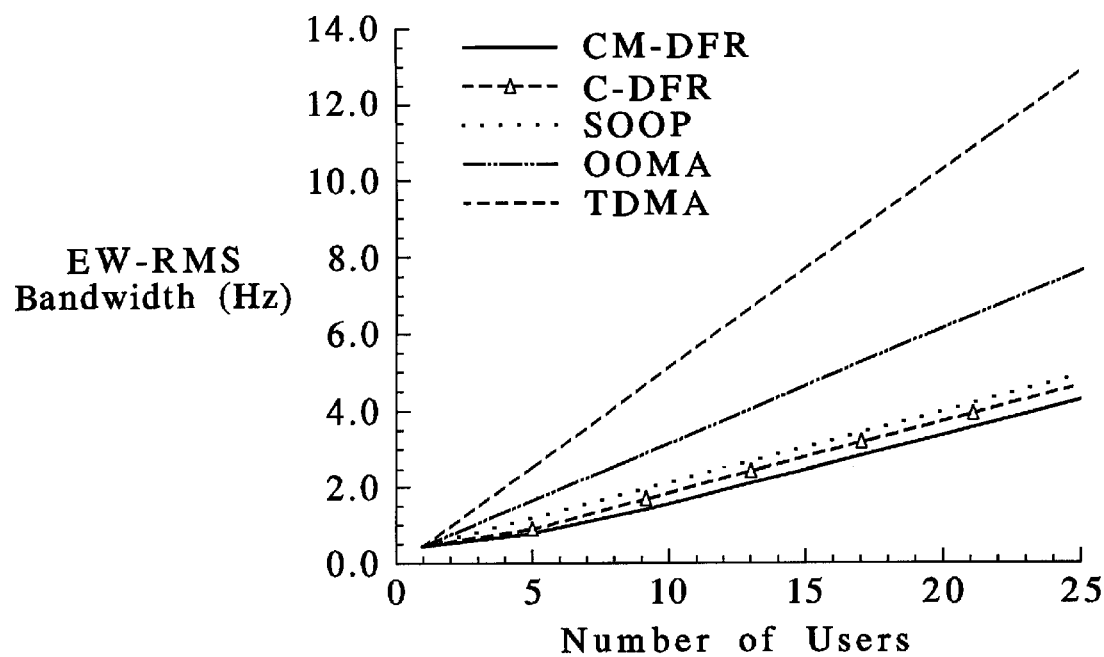
FIG. 2 illustrates a graph of bandwidth requirement in an embodiment of a method of the present invention.

FIGS. 1 and 2 depict the bandwidth requirement with the excess power parameter y assumed to be 3 dB stronger. In practice, of course, the user power distributions may be quite different and changing in time. The more disparity there is in the signal powers of various users, the smaller the bandwidth required. Therefore, the assumption used in the present invention seems conservative in light of the fact that, up to 90 dB, power imbalances between the various transmitters have been measured in practice (see S. Verdu, "Demodulation in the Presence of Multiuser Interference: Progress and Misconceptions," Intelligent Methods in Signal Processing and Communications, Docampo et al. eds., Boston, 1997, pp. 15–44).

TDMA performs worst followed by OOMA so that even if a multiple-access technique is just used that dynamically assigns overlapped but orthogonal signals, significant gains would be seen over TDMA. The SOOP DFR in BEMA performs better than OOMA, and better still are the Cholesky-DFR and the CM-DFR. However, signal design for the CM-DFR is not detailed herein.

The present invention focuses on the further development of the general methodology described in the proposal for designing multi-user communication systems that are highly bandwidth efficient while meting given complexity constraints and performance specifications for all users. Multi-user decision feedback receivers are to be used at base stations, and bandwidth efficient signaling waveforms that are specifically tailored to those receivers are to be designed and dynamically allocated.

In studying multi-user decision feedback receivers, a methodology combines the traditional multi-user information theoretical approach of successive cancellation for channels with coding and no spreading, and the approach of decision feedback multi-user detection for uncoded channels with spreading alone (as in CDMA) but no coding. Some issues are below as follows:

In designing detectors or equalizers for multi-user channels, specific attention must be paid to singular channels. Singular channels are motivated by the fact that the optimum signature waveforms have been found for the CM-DFR to be often linearly dependent. For example, the signals corresponding to the bandwidth of the CM-DFR based system of FIGS. 1 and 2, were linearly dependent. Note that this is in stark contrast to the usual CDMA approach of relying on quasi-orthogonality. In general, large power imbalances call for highly correlated or linearly dependent signals so that there is more reliance on coding and less on spreading, and the worst case scenario of equal received powers calls for orthogonal signaling thereby emphasizing spreading as opposed to coding. Note incidentally, that this implies that orthogonal or quasi-orthogonal signals are far from being optimal in a majority of the situations encountered in mobile communications. Moreover, a large body of work in multi-user detection that relies heavily on quasi-orthogonality, particularly de-correlative and even linear MMSE strategies are ill-advised for such channels because they either do not exist, and even if they do, they are plagued by large noise-enhancement factors.

The generalization of the idea of Rate-Splitting Multiple Access of Rimoldi et al. supra from the conventional GMAC to the more general GMAC where transmitters use distinct waveforms is of interest. This is motivated by the fact that, while optimum signature waveforms for the CM-DFR were often found to be singular, they were far from being identical. Although the general GMAC includes the CGMAC as a special case, it is not a simple matter to extend RSMA to the general GMAC. The formulae that describe the users' capacities when incorporating DFRs for a general GMAC do not lend themselves to algebraic manipulation as readily as they do in the CGMAC. As a result, development of RSMA for the general GMAC requires a thorough understanding of the information theory of Gaussian random vectors, making full use of the relationships found therein, in order to find a construction that gives a virtual channel and a DFR that allows any point in the capacity region to be achieved.

The analysis of error propagation effects in decision feedback equalizers for coded systems through the study of capacity bounds and bounds on reliability functions is of interest. Capacity bounds are motivated by the observation that not all channels are expected to yield equalizers that achieve corner points of capacity regions. The reliability function analysis, on the other hand, exposes the sub-optimality of the CM-DFR relative to the jointly optimal receiver for the Gaussian channel for instance, and is, hence, important to gauge performance in realistic systems with finite- length codes. To consider the role of error exponents in the general GMAC requires foremost the generalization of previous error-exponent results for the CGMAC in Gallager, supra because these are not directly applicable to the general GMAC. Also, to discuss the error exponents of any type of receiver that incorporates decision feedback, it is necessary to address the effects that feedback has on the error exponents since, for any analysis that includes probability of error, the feedback of incorrect symbol decisions cannot be ignored. Our preliminary results on this subject can be found in Guess et al., "Onion Peeling . . ." supra.

The primary effect of allowing the users to operate in an asynchronous fashion is that the channel model is no longer "memory-less." The correlation matrix of the synchronous case becomes a multivariate spectrum, in the asynchronous case, and one is forced to deal with random processes instead of random variables. An important consequence is that not all points in the capacity region of such a channel are achievable with a single-letter characterization. That is, there does not exist a single spectral density for the users that allows every point of the capacity region to be achieved. This differs drastically from the synchronous case, and it has the effect of "rounding off" the vertices in the capacity region of the synchronous case. Thus, generalizations of any results for the synchronous general GMAC, such as the CM-DFR and RSMA, must be considered anew because the generalizations are not trivial.

A beneficial direction in which to proceed with decision-feedback receiver (DFR) research is to consider the case where, in addition to additive white Gaussian noise, the users also experience Rayleigh fading. Even when the data symbols of the users are interleaved perfectly so that the channel can be viewed as memoryless, the approach taken in Guess et al., "Onion Peeling . . . ," supra to develop the capacity-maximizing DFR (CM-DFR) for the general GMAC is not applicable since the derivation used there assumes that the interfering users have Gaussian symbol distributions. For the fading channel, this assumption is no longer valid, so there is further work to be done if the CM-DFR idea is to be applied to the fading channel. On the other hand, the decorrelating structure of the Cholesky DFR (C-DFR) (see Guess et al., "Onion Peeling . . . ," supra) allows it to be used on the fading channel because the effective channel seen by each user is a single-user Rayleigh fading channel. A possibility for increasing the total capacity of the users when the C-DFR is incorporated might be to re-order the users at each symbol interval so that users are decoded in the order of the instantaneous powers (these are varying because of the fading). However, this works directly against the interleaving of large blocks of data symbols, something that is necessary if the memoryless-channel assumption is to be retained. Finally, it would be beneficial to derive the capacity region of the multi-user Rayleigh-fading channel so that the performances of various receiver structures can be compared not only to each other, but also to the optimum receiver.

In signal design, the focus is on obtaining fast and efficient algorithms for computing bandwidth efficient signals that allow the decision feedback multi-user receivers at the base station to achieve given performance specifications. The following issues are addressed:

The analysis of power spectral densities of superpositions of modulated waveforms and the determination of signal bandwidth in multiple access channels with correlated signaling is to be undertaken. While these appear to be eminently tractable for linear modulation (such a result allowed is to consider the minimization of the energy-weighted RMS bandwidth of the signature waveforms for the PAM-synchronous multi-user channel, for instance), simple non-linear modulation schemes can present very interesting analytical challenges.

The specification of the signaling waveform correlations (spectra in the case of asynchronous channels) that are maximally correlated while allowing the receiver to meet given specifications is an important class of problems. An example of this for the Gaussian channel is our sequential computation of the correlation matrix for the Gaussian channel for the Cholesky decisions feedback receiver as described in the proposal and as detailed in Guess et al., "Onion Peeling . . . ," supra.

The study of the above issues for realistic channels models includes quasi-synchronism, fading, multi-path and other diversity effects. Complete symbol asynchronism may be a difficult issue. However, there is evidence that current-day GPS technology (see R. A. Iltis, "Demodulation and Code Acquisition Using Decorrelator Detectors for QS-CDMA, IEEE Trans. Commun. 44:11, November 1996, pp. 1561–1571 and Iltis et al., "Multiuser Detection of Quasi-synchronous CDMA Signals Using Linear Decorrelators," IEEE Trans. Commun. , 44:11. November 1996, pp. 1561–1571) can achieve timing alignment to within about 2 $\mu$s thereby increasing the importance of synchronous and quasi-synchronous multiple-access communication. Micro- and pico-cellular architectures, such as those found in wireless local area networks and urban mobile communication, are applications where even symbol synchronism is not entirely unattainable. The adaptive timing alignment technique used in GSM can be used in conjunction with GPS, and one can take advantage of the fact that symbol durations in BEMA are larger than in TDMA by a factor equal to the number of users per carrier (this is equal to 8 in GSM). Consequently, our focus on signal design will be on synchronous and quasi-synchronous channels. The scope of this project is broad, and, yet the problems described herein are quite specific.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

We claim:

1. A method for improving channel bandwidth utilization in a communication system, the method comprising the steps of:

providing an available communication channel;

evaluating available channel bandwidth for a plurality of signals applied to the available communication channel;

determining signal power characteristics of the plurality of signals;

defining a plurality of signature waveforms;

dynamically allocating the signature waveforms to a plurality of transmitters; and multiplexing the plurality of signals onto the communication channel based on the plurality of signature waveforms.

2. The method of claim 1 wherein the plurality of signals are digital data sequences.

3. The method of claim 1 wherein the available channel has a fixed frequency range.

4. The method of claim 1 further comprising the step of:

assigning signaling power parameters to each receiving device.

5. The method of claim 1 further comprising the step of:

designing the signature waveforms for each receiving device.

6. The method of claim 1 further comprising the step of:

designing the signature waveforms to meet receiver performance specifications for each user.

7. The method of claim 1 wherein the signature waveforms are re-designed based on changes in traffic conditions in the communication channel.

8. The method of claim 1 wherein the signature waveforms are re-designed based on received power levels.

9. The method of claim 1 wherein the signature waveforms are re-designed based on the number of transmitters.

10. The method of claim 1 further comprising the step of:

using extra received power to assign signals with smaller bandwidths.

11. The method of claim 1 further comprising the step of:

increasing the number of users by using extra received power to assign signals with smaller bandwidths.

12. A method for improving channel bandwidth utilization in a communication system, the method comprising the steps of:

providing an available communication channel;

evaluating available channel bandwidth for a plurality signals applied to the available communication channel;

determining signal power characteristics of the plurality of signals;

defining a plurality of signature waveforms;

multiplexing the plurality of signals onto the communication channel based on the plurality of signature waveforms; and redesigning the plurality of signature waveforms based on changes in traffic conditions in the communication channel.

* * * * *